United States Patent
Condoluci et al.

(10) Patent No.: US 12,267,730 B2
(45) Date of Patent: *Apr. 1, 2025

(54) NOTIFICATION CONTROL IN A COMMUNICATION SYSTEM

(71) Applicant: Telefonaktiebolaget LM Ericsson (publ), Stockholm (SE)

(72) Inventors: Massimo Condoluci, Solna (SE); Thorsten Lohmar, Aachen (DE); Ylva Timner, Luleå (SE); Paul Schliwa-Bertling, Ljungsbro (SE); Peter Hedman, Helsingborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 764 days.

This patent is subject to a terminal disclaimer.

(21) Appl. No.: 17/283,063

(22) PCT Filed: Oct. 12, 2018

(86) PCT No.: PCT/EP2018/077965
§ 371 (c)(1),
(2) Date: Apr. 6, 2021

(87) PCT Pub. No.: WO2020/074108
PCT Pub. Date: Apr. 16, 2020

(65) Prior Publication Data
US 2021/0377810 A1 Dec. 2, 2021

(30) Foreign Application Priority Data
Oct. 8, 2018 (WO) ............... PCT/CN2018/109314

(51) Int. Cl.
*H04W 28/24* (2009.01)
*H04W 28/02* (2009.01)
(Continued)

(52) U.S. Cl.
CPC ....... *H04W 28/24* (2013.01); *H04W 28/0268* (2013.01); *H04W 28/12* (2013.01); *H04W 28/18* (2013.01)

(58) Field of Classification Search
None
See application file for complete search history.

(56) References Cited

U.S. PATENT DOCUMENTS

2018/0270679 A1    9/2018  Laselva et al.
2020/0112907 A1*   4/2020  Dao ................. H04M 15/8016

FOREIGN PATENT DOCUMENTS

WO    2016091298 A1    6/2016
WO    2017193970 A1    11/2017
(Continued)

OTHER PUBLICATIONS

Ericsson, "Resolve ENs in Solution #17 for QoS Support for eV2X over Uu interface", 3GPP SA WG2 Meeting #129, Dongguan, China, Oct. 15-19, 2018, pp. 1-4, S2-1810132, 3GPP.
(Continued)

*Primary Examiner* — Kouroush Mohebbi
(74) *Attorney, Agent, or Firm* — COATS & BENNETT, PLLC

(57) ABSTRACT

A method for notification control in a communication system performed by a core network is presented. The method comprising: establishing a PDU session; enabling a radio access network, RAN, to send a notification that notifying a UE, of the unfulfillment or re-fulfillment of QoS, for a QoS Flow in the PDU session using an AN-signaling based notification. The AN-signaling based notification including the unfulfillment or re-fulfillment of QoS parameters as defined in a QoS Flow description. The AN-signaling based notification further including expected QoS figures, an expected time interval and an accuracy of the notification.
(Continued)

The UE/AF may further adapt their behavior according to the expected QoS provided by the AN.

20 Claims, 7 Drawing Sheets

(51) Int. Cl.
*H04W 28/12* (2009.01)
*H04W 28/18* (2009.01)

(56) References Cited

FOREIGN PATENT DOCUMENTS

WO 2017194768 A1 11/2017
WO 2018172601 A1 9/2018

OTHER PUBLICATIONS

Ericsson, "Notification Control over NGAP", 3GPP TSG-RAN WG3 Meeting #99bis, Sanya, China, Apr. 16, 2018, pp. 1-4, R3-182148, 3GPP.

Qualcomm Incorporated, "Add Indication of Notification Control to QoS Rules Sent to UE", 3GPP TSG-SA WG2 Meeting #127, Sanya, China, Apr. 16, 2018, pp. 1-3, S2-184549, 3GPP.

Huawei et al., "Updated on Key Issue Description", SA WG2 Meeting #127, Sanya, China, Apr. 16, 2018, pp. 1-3, 62-183632, 3GPP.

Ericsson, et al., Missing requirements to trigger Notification Control, SA WG2 Meeting #S2-128BIS, Aug. 20-24, 2018, Sophia Antipolis, France, S2-189009 (revision of S2-188932, 8740was8027).

Nokia, et al., Handling of Notification Control in TS 38.413, 3GPP TSG-RAN WG3#99, Athens, Greece, Feb. 26-Mar. 2, 2018, R3-180934.

LG Electronics Inc., Traffic treatment for GBR QoS flow, 3GPP TSG-RAN WG2 NR AH#3, Vancouver, Canada, Jan. 22-26, 2018, R2-1801453.

3Gpp, 3rd Generation Partnership Project; Technical Specification Group Core Network and Terminals; 5G System; Policy and Charging Control signalling flows and QoS parameter mapping; Stage 3 (Release 15), 3GPP TS 29.513 V15.1.0 (Sep. 2018).

* cited by examiner

| the unfulfillment or re-fulfillment of QoS parameters | Expected QoS figures | Expected time interval | accuracy | ... |
|---|---|---|---|---|
| | | | | |

NOTIFICATION CONTROL IN A COMMUNICATION SYSTEM

TECHNICAL FIELD

Embodiments presented herein relate to a method, a core network, a radio access network, a user equipment, computer programs, and a computer program product for supporting notification control in a communication system.

BACKGROUND

Currently, the future generation of wireless communications, commonly referred to as Next Generation (NextGen or NG), Next Generation System (NGS) or 5G, is being developed all over the world. The vision of Next Generation wireless communication lies in providing very high data rates, extremely low latency, and manifold increase in base station capacity, and significant improvements of user perceived QoS (Quality of service), compared to current 4G LTE networks.

3GPP SA2 has specified a 5GS architecture in the 3GPP TS 23. 501, which is illustrated in FIG. 1.

5G QoS Flow is the finest granularity for QoS forwarding treatment in the 5G system. All traffic mapped to the same 5G QoS Flow receive the same forwarding treatment (e.g. scheduling policy, queue management policy, rate shopping policy, RLC configuration, etc.). Separate 5G QoS Flow can provide different QoS forwarding treatment. GBR (guaranteed bitrate) QoS Flow refers to the QoS Flow that require guaranteed flow bit rate.

Currently, as illustrated in FIG. 2, the notification control and notification in 5GS (the $5^{th}$ Generation System) is as follows. AF (Application Function) requests notification if QoS required for a service cannot be guaranteed or can be guaranteed again for a GBR QoS Flow during the lifetime of the QoS Flow. PCF (policy control function) pass that request to the SMF (session management function). The SMF shall only enable Notification control when the QoS Notification Control parameter is set in the PCC rule (received form the PCF) that is bound to the QoS Flow. When the RAN (radio access network) determines that the QoS for a GBR QoS Flow cannot be guaranteed, the RAN notifies 5GC (the $5^{th}$ Generation Core), which comprises SMF and PCF etc., and the 5GC further notifies the AF. When applicable, RAN sends a new notification, informing SMF that GBR can be guaranteed again. And then the AF at the application layer informs the UE. That is to say, to reach UE, the notification path is RAN, SMF, PCF to AF, and then AF to UE. This notification path may be considered too long, especially for time critical applications, for instance, V2X (vehicle to everything) applications such as remote driving and automated driving.

In TS 23.502v15.2.0, 3GPP introduced the "Notification control" procedure where the 5G radio access network (RAN) indicates to the 5G core (5GC) that the Guaranteed Flow Bit Rate (GFBR) for an active QoS flow of a packet data unit (PDU) Session can no longer be fulfilled, thus enabling the possibility for the 5GC to react (e.g., by triggering a modification or a removal of the QoS flow) to a change of QoS capabilities and/or to inform the Application Function (AF) as soon as communicated by the 5G-RAN. However, the Notification control is applied only guaranteed bit rate (GBR) flows as it is a notification associated to GFBR, which is not enough for the applications to adjust their behaviors (e.g. selection of certain control algorithm, setting of the speed of the vehicle and the safety distance) when remotely controlling vehicles or other objects such as machines in a factory.

SUMMARY

A general object of the embodiments herein is to provide notification control in a communication system. Notification from RAN directly to UE via RRC notification may be necessary. If the notification (i.e. notification from RAN to UE) is to be applied, there is no mechanism to control when to apply it.

Therefore, it is an object of the present disclosure to solve at least one of the above-mentioned problems.

In the proposed solution, the AF can explicitly request the access network via 5GC to apply the AN-based notification. And the 5GC can enable the AN-based notification based on AF's request and the UE's session management capability, or simply based on the local policy.

According to a first aspect of the present disclosure, a method for notification control in a communication system performed by a core network is presented. The method comprising: establishing a PDU (protocol data unit) session; enabling a RAN to send a notification that notifying a user equipment, UE, of the unfulfillment or re-fulfillment of QoS, for a QoS Flow in the PDU session using an AN-signaling based notification.

According to a second aspect of the present disclosure, a method for notification control in a communication system, performed by a RAN is presented. The method comprising: receiving a notification enable indication from a core network that indicating enabling an AN-signaling based notification, to notify a UE, of the unfulfillment or re-fulfillment of QoS, for a QoS flow in a PDU session; and notifying the UE of the unfulfillment or re-fulfillment of QoS using the AN-signaling based notification.

According to a third aspect of the present disclosure, a method for notification control in a communication system, performed by a user equipment, UE, is presented. The method comprising: establishing a PDU session; receiving a notification that notifying the UE of the unfulfillment or re-fulfillment of QoS for a QoS Flow in a PDU session in the AN-signaling based notification.

According to a fourth aspect of the present disclosure, requesting a notification that notifying the AF of the unfulfillment or re-fulfillment of quality of service, QoS, for a QoS Flow in a protocol data unit, PDU session; receiving a notification that notifying the AF of the unfulfillment or re-fulfillment of QoS, for a QoS Flow in the PDU session.

According to a fifth aspect of the present disclosure, a core network for notification control in a communication system is presented. The core network comprising: a processing circuity; and a storage medium storing instructions that, when executed by the processing circuity, cause the core network to: establishing a protocol data unit, PDU, session; enabling a RAN to notify a UE of the unfulfillment or re-fulfillment of QoS, for a QoS Flow in the PDU session.

According to a sixth aspect of the present disclosure, a RAN for notification control in a communication system is presented. The RAN comprising: a processing circuity; and a storage medium storing instructions that, when executed by the processing circuity, cause the RAN to: receiving a notification enable indication from a core network that indicating enabling an AN-signaling based notification, to notify a UE, of the unfulfillment or re-fulfillment of QoS, for a QoS flow in a PDU session; and notifying the UE of the unfulfillment or re-fulfillment of QoS using the AN-signaling based notification According to a seventh aspect of the present disclosure, a UE for notification control in a communication system is presented. The UE comprising: a processing circuitry; and a storage medium storing instructions that, when executed by the processing circuitry, cause the UE to: establishing a PDU session; receiving a notification that notifying the UE of the unfulfillment or re-fulfillment of QoS for a QoS Flow in a PDU session in the AN-signaling based notification.

According to an eighth aspect of the present disclosure, an application function, AF, for notification control in a communication system, comprising: a processing circuitry; and a storage medium storing instructions that, when executed by the processing circuitry, cause the AF to: requesting a notification that notifying the AF of the unfulfillment or re-fulfillment of quality of service, QoS, for a QoS Flow in a protocol data unit, PDU session; receiving a notification that notifying the AF of the unfulfillment or re-fulfillment of QoS, for a QoS Flow in the PDU session.

According to a ninth aspect of the present disclosure, a computer program product is presented. The computer program product comprising a computer readable storage medium storing instruction that, when executed by at least one processor of a computing system, cause a computing system to perform the method any of the first to the third aspects of the invention.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
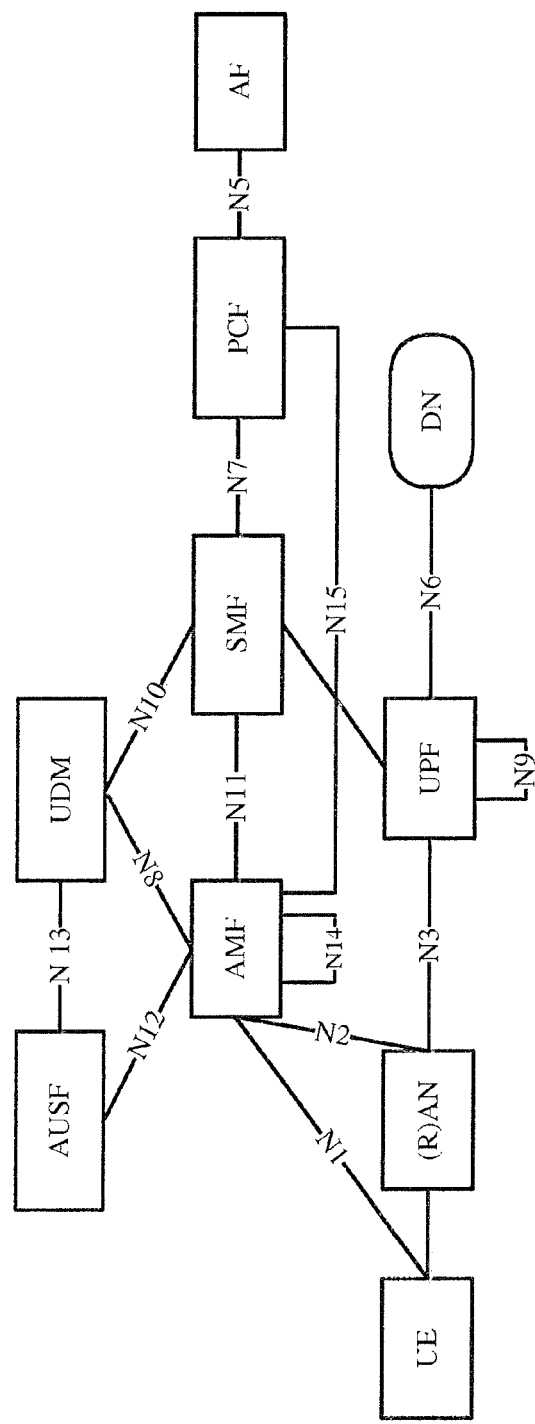
FIG. 1 illustratively shows a schematic diagram illustrating the non-roaming architecture of next generation system.
Figure 2:
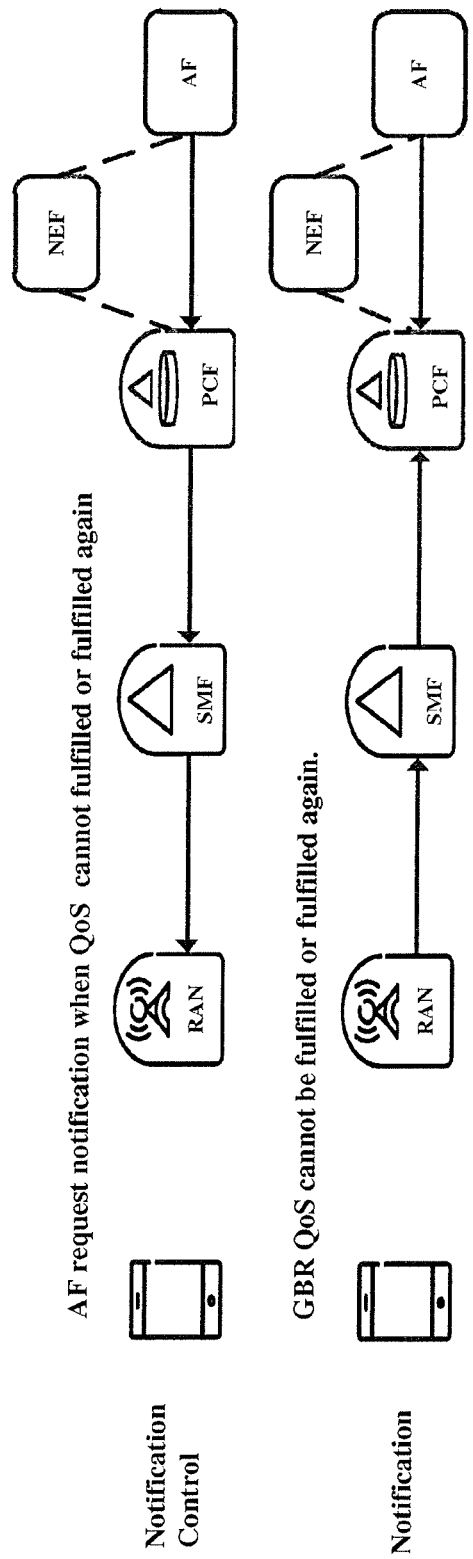
FIG. 2 illustratively shows the current mechanism of notification control and notification.

Embodiments of the present disclosure will be described more fully hereinafter with reference to the accompanying drawings, in which embodiments of the disclosure are shown. This invention may, however be embodied in many different forms and should not be constructed as limited to the embodiments set forth herein. Any step or feature illustrated by dashed lines should be regarded as optional.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprising", "includes" and/or "including" used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present disclosure is described below with reference to block diagrams and/or flowchart illustrations of methods, apparatus (systems) and/or computer program products according to embodiments of the disclosure. It is understood that blocks of the block diagrams and/or flowchart illustrations, and combinations of blocks in the block diagrams and/or flowchart illustrations, can be implemented by computer program instructions. These computer program instructions may be provided to a processor of a general-purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present disclosure may be embodied in hardware and/or in software (including firmware, resident software, micro-code, etc.). Furthermore, the present disclosure may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Embodiments of the disclosure will be described below with reference to the drawings.

FIG. 1 is a schematic diagram illustrating a communication network where embodiments presented herein are applied. FIG. 1 illustrate the entities of the 5GC, including example network interfaces N1, N2, N3, N4, N5, N6, N7, N8, N9, N10, N11, N12, N13. The 5GC thus comprise Authentication Server Function (AUSF), Unified Data Management (UDM), Core Access and Mobility Management Function (AMF), Session Management Function (SMF), Policy Control function (PCF), User plane Function (UPF), Data network (DN).

Figure 3:
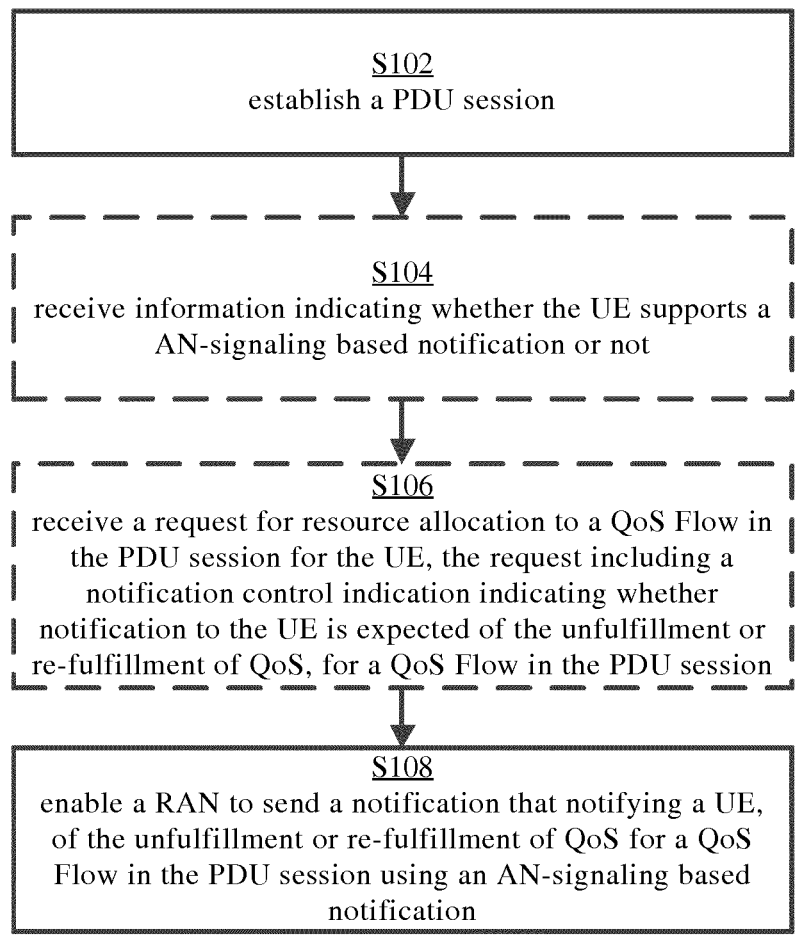
FIG. 3 illustratively shows the method performed by a core network for notification control in a communication system in accordance with an embodiment of the disclosure.
Figure 4:
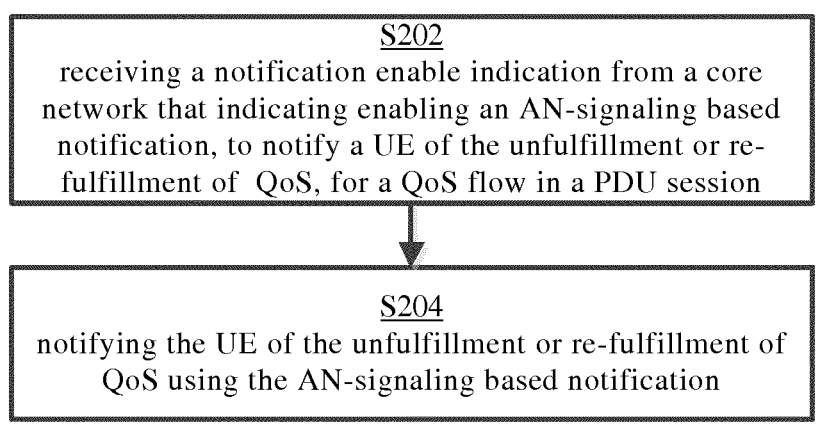
FIG. 4 illustratively shows the method performed by a RAN for notification control in a communication system in accordance with an embodiment of the disclosure.
Figure 5:
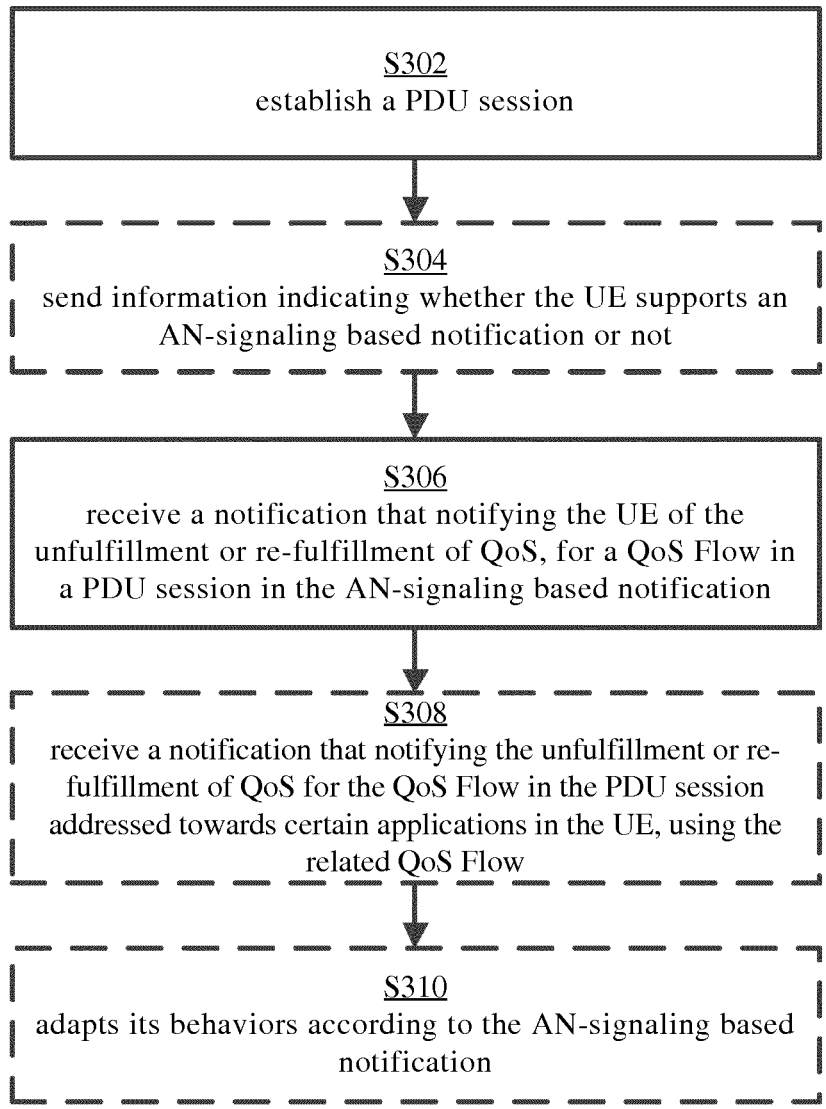
FIG. 5 illustratively shows the method performed by a UE for notification control in a communication system in accordance with an embodiment of the disclosure.

FIG. 3 illustratively shows the method performed by a core network for notification control in a communication system. FIG. 4 illustratively shows the method performed by a RAN for notification control in a communication system. FIG. 5 illustratively shows the method performed by a UE for notification control in a communication system.

Reference is now made to FIG. 3, which illustrates a method performed by a core network for notification control in a communication system according to an embodiment.

S102: The core network establishes a PDU session in response to the PDU session establishment process initiated by UE. An established PDU Session has an active QoS Flow, thus with associated QoS parameters, such as GFBR (Guaranteed Flow Bit Rate), PDB (Packet Delay Budget), PER (Packet Error Rate), etc.

S108: The core network enables a RAN to notify a UE of the unfulfillment or re-fulfillment of QoS, for a QoS Flow in the PDU session using an access network, AN-signaling based notification. The unfulfillment of the QoS for a QoS Flow in the PDU session refers to a GBR QoS Flow cannot be fulfilled. For V2X (vehicle to everything) applications such as remote driving or automated driving, the GBR QoS Flow cannot be fulfilled may occur when the driving speed increases, and it may cause safety issues.

The AN-signaling based notification may include the unfulfillment or re-fulfillment of QoS parameters as defined in a QoS Flow description. The AN-signaling based notification may carry information about the unfulfillment/re-fulfillment of the PDB, PER and other QoS parameters as defined in the QoS Flow description, in addition to the GFBR.

The AN-signaling based notification further including expected QoS figures when the current parameters of QoS Flow are unfulfilled. This field contains the QoS figures that the network is expected to support when the current parameters of QoS Flow cannot be fulfilled. This field can be implemented in different ways. The network can provide a new QoS Profile, i.e., 5QI (5G QoS Identifier), GFBR and all parameters associated to the QoS Profile, or a subset of information associated to the QoS Profile (e.g., only expected PDB and PER for example or only expected GFBR). Another way to represent the expected QoS figures is the exploitation of ranges (e.g., the PDB is expected to be between 20 ms and 30 ms).

The AN-signaling based notification further including an expected time interval, the expected time interval indicates the duration the RAN expects to be able to support the expected QoS figures. The expected time interval is associated to the notification. For instance, the network expects to be able to support the expected QoS figures for the next 1 minute. In case the expected QoS figures field is not provided, the network expects of not being able to fulfill the parameters of the QoS Flow for the next 1 minute.

Additionally, the AN-signaling based notification may be extended with information related to the accuracy (e.g., confidence intervals, probability of correct estimation or other ways available for accuracy calculation) of the notification. For example, considering a Notification control where the field expected QoS figures is present, the accuracy field can represent the accuracy associated to the calculation of the expected QoS figures. In another example considering a Notification control with indication about the QoS parameter that cannot be fulfilled and an associated expected time interval, the accuracy field indicates the accuracy associated to the calculation of the expected time interval.

The embodiments above have the impact that the notification control is generated not only in case of unfulfillment/re-fulfillment of the GFBR, but also in case of unfulfillment/re-fulfillment of the PDB, PER, and other QoS parameters as defined in the QoS Flow description. As a result, in an embodiment, the Notification control is generated by the RAN when it determines that one (not only GFBR) of the QoS parameters associated to the QoS cannot be fulfilled (or it can be fulfilled again). The setting of which QoS parameter(s) the generation of Notification control is associated to can be configured considering network policies or capabilities, and/or UE subscription information and/or negotiation between the network and the AF and/or SLA (Service-Level Agreement). This setting can be re-used for the field of expected QoS figures (e.g., the Notification control indicates that the PDB cannot be fulfilled and also the expected PDB figure) or a different setting can be used for this field.

The fields associated to the Notification control procedure is modified, regardless it is transmitted towards the AF or the UE. That is to the modification to AF may also include the unfulfillment or re-fulfillment of QoS parameters as defined in a QoS Flow description; include expected QoS figures when the current parameters of QoS Flow being unfulfilled; include an expected time interval, the expected time interval indicates the duration the RAN expects to be able to support the expected QoS figures; as well as the accuracy of the Notification. A different setting of the parameters of the Notification control when sent to the AF and to the UE can be implemented, according to network policies and/or UE subscription information and/or negotiation between the network and the AF and/or SLA. For example, the AF can receive a Notification control with the fields QoS parameter that cannot be fulfilled and expected QoS figures while the UE can receive a Notification Control only with the field QoS parameter that cannot be fulfilled. The configuration of Notification control towards the UE and the AF can be set according to network policies or capabilities, and/or UE subscription information and/or negotiation between the network and the AF and/or SLA.

In some aspects, the core network receives information indicating whether the UE supports an AN-signaling based notification or not, as illustrated in S104. The information may be included in the PDU session establishment request which is sent by UE. AN-signaling is a type of signaling being used between 5G-AN, e.g. RAN, and UE, which including but not limited to RRC (radio resource control)-based and MAC (media resource control)-based signaling etc.

In some aspects, the core network receives a request for resource allocation to a QoS Flow in the PDU session for the UE, and the request includes a notification control indication indicating whether notification to the UE is expected, as illustrated in S106. The core network receives GBR resource allocation request from AF, and the request include a notification control indication indicating weather notification to the UE is expected, that is to say the notification control indication indicating whether to notify UE or not when QoS for a QoS Flow in the PDU session being unfulfilled or re-fulfilled. Furthermore, the request may also include a notification control indication indicating whether notification to the AF is expected as today, namely the notification control indication indicating whether to notify AF or not when QoS, for a QoS Flow in the PDU session being unfulfilled or re-fulfilled. In addition, the request further indicates which QoS parameter the notification refers to, for instance PDB, PER and other QoS parameters as defined in the QoS Flow description, the request further request to notify expected QoS figures, the expected time interval which indicates the duration the RAN expects to be able to support the expected QoS figures, or the accuracy of the Notification.

In an embodiment, the core network may only enable the RAN to notify a UE of the unfulfillment or re-fulfillment of QoS for the QoS Flow in a PDU session when the UE supports the AN-signaling based notification.

In another embodiment, the core network may only enable the RAN to notify a UE of the unfulfillment or re-fulfillment of QoS for the QoS Flow in a PDU session when the AN-signaling based notification is expected.

In yet another embodiment, the core network may only enable the RAN to notify a UE of the unfulfillment or re-fulfillment of QoS for the QoS Flow in a PDU session when the UE supports the AN-signaling based notification and the AN-signaling based notification is expected.

As an additional embodiment, the information received by the core network may further include the information indicating whether the UE supports the AN-signaling based notification or not for certain applications in the UE. The UE may indicate whether the support for the AN-signaling based notification is supported, wanted or beneficial per application. Such information can be declared using same or similar information as used in the UE Route Selection Policy Rule (see TS 23.503), i.e. application identifier by traffic descriptor, for instance application descriptors with OSId and OSAppId(s).

Likewise, the notification control indication received by the core network may further indicate whether the AN-signaling based notification to certain applications of the UE is expected. The core network receives GBR resource allocation request from AF, and the request include a notification control indication indicating which application(s) in the UE is relevant for example by way of identifying application(s).

In an additional embodiment, the core network enables the RAN to notify the UE of the unfulfillment or re-fulfillment of QoS for the QoS Flow in the PDU session when the QoS Flow is addressed towards certain applications of the UE.

In another embodiment, the core network may enable the RAN, to notify the core network of the unfulfillment or re-fulfillment of QoS for the QoS Flow in the PDU session. The core network may enable the RAN, to notify both the core network and the UE of the unfulfillment or re-fulfillment of QoS for the QoS Flow in the PDU session.

Reference is now made to FIG. 4, which illustratively shows the method performed by a RAN for notification control in a communication system.

S202: RAN receives a notification enable indication from a core network that indicating to send a notification that notifying a user equipment, UE, of the unfulfillment or re-fulfillment of quality of service, QoS, for a QoS flow in a protocol data unit, PDU, session using an access network, AN-signaling based notification. In an embodiment, the notification enable indication may also indicate to notify the core network of the unfulfillment or re-fulfillment of QoS for a QoS flow in a PDU session as today. The AN-signaling based notification may be RRC-based notification, MAC-based notification etc., which is used between RAN and UE.

S204: RAN notifies the UE of the unfulfillment or re-fulfillment of QoS using the AN-signaling based notification. In specific, when RAN determines that the QoS cannot be guaranteed, it notifies the UE. The RAN may only notify the core network as today. In an additional embodiment, the RAN may notify to both the core network and the UE when the QoS cannot be guaranteed.

As mentioned above, the AN-signaling based notification may include the unfulfillment or re-fulfillment of QoS parameters as defined in a QoS Flow description. The AN-signaling based notification may carry information about the unfulfillment/re-fulfillment of the PDB, PER and other QoS parameters as defined in the QoS Flow description, in addition to the GFBR.

The AN-signaling based notification further including expected QoS figures when the current parameters of QoS Flow are being unfulfilled. This field contains the QoS figures that the network is expected to support when the current parameters of QoS Flow cannot be fulfilled. This field can be implemented in different ways. The network can provide a new QoS Profile, i.e., 5QI (5G QoS Identifier), GFBR and all parameters associated to the QoS Profile, or a subset of information associated to the QoS Profile (e.g., only expected PDB and PER for example or only expected GFBR). Another way to represent the expected QoS figures is the exploitation of ranges (e.g., the PDB is expected to be between 20 ms and 30 ms).

The AN-signaling based notification further including an expected time interval, the expected time interval indicates the duration the RAN expects to be able to support the expected QoS figures. The expected time interval is associated to the notification. For instance, the network expects to be able to support the expected QoS figures for the next 1 minute. In case the expected QoS figures field is not provided, the network expects of not being able to fulfill the parameters of the QoS Flow for the next 1 minute.

Additionally, the AN-signaling based notification may be extended with information related to the accuracy (e.g., confidence intervals, probability of correct estimation or other ways available for accuracy calculation) of the Notification. For example, considering a Notification control where the field expected QoS figures is present, the accuracy field can represent the accuracy associated to the calculation of the expected QoS figures. In another example considering a Notification control with indication about the QoS parameter that cannot be fulfilled and an associated expected time interval, the accuracy field indicates the accuracy associated to the calculation of the expected time interval.

In another embodiment, the notification enable indication further indicates enabling an AN-signaling based notification, to notify the UE of the unfulfillment or re-fulfillment of QoS for the QoS Flow in the PDU session addressed towards certain applications of the UE.

Reference is now made to FIG. 5, which illustratively shows the method performed by a UE for notification control in a communication system.

S302: UE establish a PDU session. UE initiated a PDU session establishment process by sending a PDU session establishment request.

S306: UE receives a notification from RAN, and the notification notifies the UE of the unfulfillment or re-fulfillment of QoS, for a QoS Flow in PDU session in the AN-signaling based notification. The AN-signaling is for example RRC-based notification or MAC-based notification.

As mentioned above, the AN-signaling based notification may include the unfulfillment or re-fulfillment of QoS parameters as defined in a QoS Flow description. The AN-signaling based notification may carry information about the unfulfillment/re-fulfillment of the PDB, PER and other QoS parameters as defined in the QoS Flow description, in addition to the GFBR.

The AN-signaling based notification further including expected QoS figures when the current parameters of QoS Flow are being unfulfilled. This field contains the QoS figures that the network is expected to support when the current parameters of QoS Flow cannot be fulfilled. This field can be implemented in different ways. The network can provide a new QoS Profile, i.e., 5QI (5G QoS Identifier), GFBR and all parameters associated to the QoS Profile, or a subset of information associated to the QoS Profile (e.g., only expected PDB and PER for example or only expected GFBR). Another way to represent the expected QoS figures is the exploitation of ranges (e.g., the PDB is expected to be between 20 ms and 30 ms).

The AN-signaling based notification further including an expected time interval, the expected time interval indicates the duration the RAN expects to be able to support the expected QoS figures. The expected time interval is associated to the notification. For instance, the network expects to be able to support the expected QoS figures for the next 1 minute. In case the expected QoS figures field is not provided, the network expects of not being able to fulfill the parameters of the QoS Flow for the next 1 minute.

Additionally, the AN-signaling based notification may be extended with information related to the accuracy (e.g., confidence intervals, probability of correct estimation or other ways available for accuracy calculation) of the Notification. For example, considering a Notification control where the field expected QoS figures is present, the accuracy field can represent the accuracy associated to the calculation of the expected QoS figures. In another example considering a Notification control with indication about the QoS parameter that cannot be fulfilled and an associated expected time interval, the accuracy field indicates the accuracy associated to the calculation of the expected time interval.

In a further embodiment, UE sending information indicating whether UE supports an AN-signaling based notification or not. UE sends the information, so that the core network may be aware of the capability of UE which indicates AN-signaling based notification is supported or not. The capability can be sent within the PDU session establishment request. Moreover, the UE may indicate whether the support for AN-signaling notification is supported, wanted or beneficial per application. As mentioned above, such information can be declared using same or similar information as used in the UE Route Selection Policy Rule (see TS 23.503), i.e. application identifier by traffic descriptor, for instance application descriptors with OSId and OSAppId(s).

In another embodiment, the UE may receive the notification further notify the unfulfillment or re-fulfillment of QoS for the QoS Flow in the PDU session addressed towards certain applications in the UE, using the related QoS Flow, when the UE supports the AN-signaling based notification, as illustrated in S308.

By extending the information included in the Notification control, this application introduces new information that can be used by the application to adapt its behavior especially with regards to the field expected QoS figures, as is illustrated in S310. In another embodiment, the information included in the Notification control proposed in this invention as used by AF, 5G network, UE, or application to adapt their respective behavior. In one example, the application exploits the Notification control to adapt its behavior (for instance, depending where the application is running and whether the application client or server can perform the adaptation, the UE or the AF relays the Notification control to the application or extrapolates some information out of the Notification control and provide such information to the application). Examples of behavior adaptation according to the field expected QoS figures for the application can be changes to traffic generation features (packet size, packet frequency, traffic encoding in case of media traffic, etc.), changes to application features (e.g., changes of control algorithms in case of applications dealing with remote control of objects), or changes of control features (for example, reducing the speed of a remotely controlled vehicle in case of an expected PDB increase to guarantee a safe reaction time for braking also in scenarios with high PDB). Another example for application adaptation for a Notification control where it is present only the field QoS parameter that cannot be fulfilled, the application being aware that the QoS cannot be fulfilled by the network enters in a safe mode (e.g., lowering the speed of the vehicle to a safe speed). In another example associated to adaptation of the AF and/or of the UE, the AF and the UE use the information in the Notification control to trigger a PDU Session Modification and to this aim they can re-use the parameters included in the expected QoS figures. For instance, the UE exploits the information contained in the field expected QoS figures to configure the field Requested QoS for a UE-requested PDU Session Modification (e.g., requesting the same QoS as that expected to be fulfilled by the network as indicated in the Notification control), in case the UE decides to trigger a PDU Session Modification after the reception of a Notification control from the RAN. In another example, the 5GC (e.g., SMF or PCF) exploits the Notification control received from RAN for SMF-requested PDU Session Modification, where the QoS Profile of the modified QoS Flows is set according to the information included in the expected QoS figures field.

Although the Notification control procedure is currently applied only to GBR flows, in this invention we extend the Notification control to cover also other QoS parameters (e.g., PDB, PER) in addition to GFBR. This means that, in a fourth embodiment, the notification control is extended also to non-GBR flows as QoS parameters such as PDB and PER are defined also for non-GBR flows.

Figure 6:
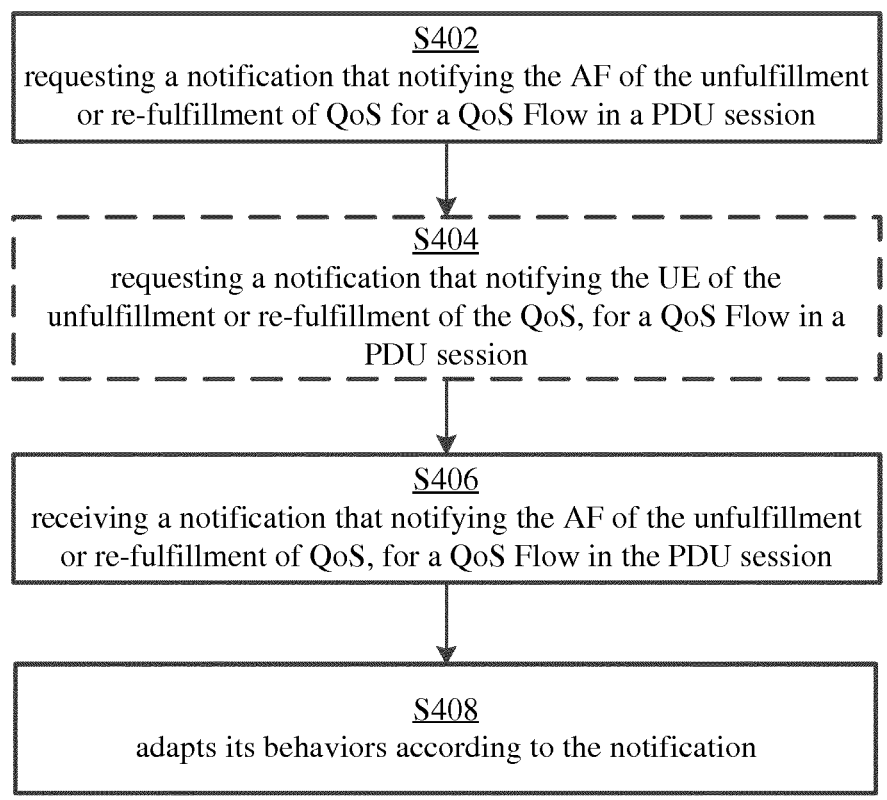
FIG. 6 illustratively shows the method performed by an AF for notification control in a communication system in accordance with an embodiment of the disclosure.

FIG. 6 illustratively shows the method performed by an AF for notification control in a communication system in accordance with an embodiment of the disclosure.

In S402, requesting a notification that notifying the AF of the unfulfillment or re-fulfillment of quality of service, QoS, for a QoS Flow in a protocol data unit, PDU session.

In S406, receiving a notification that notifying the AF of the unfulfillment or re-fulfillment of QoS, for a QoS Flow in the PDU session.

In an embodiment, the notification including the unfulfillment or re-fulfillment of QoS parameters as defined in a QoS Flow description. The notification may further include expected QoS figures when the current parameters of QoS Flow are unfulfilled. The expected QoS figures are provided in a new QoS profile or a subset of the new QoS profile. The notification further including an expected time interval, the expected time interval indicates the duration the RAN expects to be able to support the expected QoS figures. The notification may further including an accuracy of the expected QoS figures. The notification may further including an accuracy of the expected time interval.

In an embodiment, the AF receiving the notification further notify the unfulfillment or re-fulfillment of QoS for the QoS Flow in the PDU session addressed towards certain applications in the AF, using the related QoS Flow.

In another embodiment, the AF adapts its behaviors according to the notification, as illustrated in S408. The AF may adapt its behaviors according to the notification comprising: changes to traffic generation features, changes to application features, or changes of control features according to the expected QoS figures. The AF may adapts its behaviors according to the notification comprising: enter a safe mode when the notification only notifies the AF of the unfulfillment of QoS, the AF may adapts its behaviors according to the notification comprising: trigger a PDU session modification to reuse the parameters included in the expected QoS figures.

In addition, the AF may also request a notification that notifying the UE of the unfulfillment or re-fulfillment of QoS, for a QoS Flow in a PDU session, as illustrated in S404.

Figure 7:
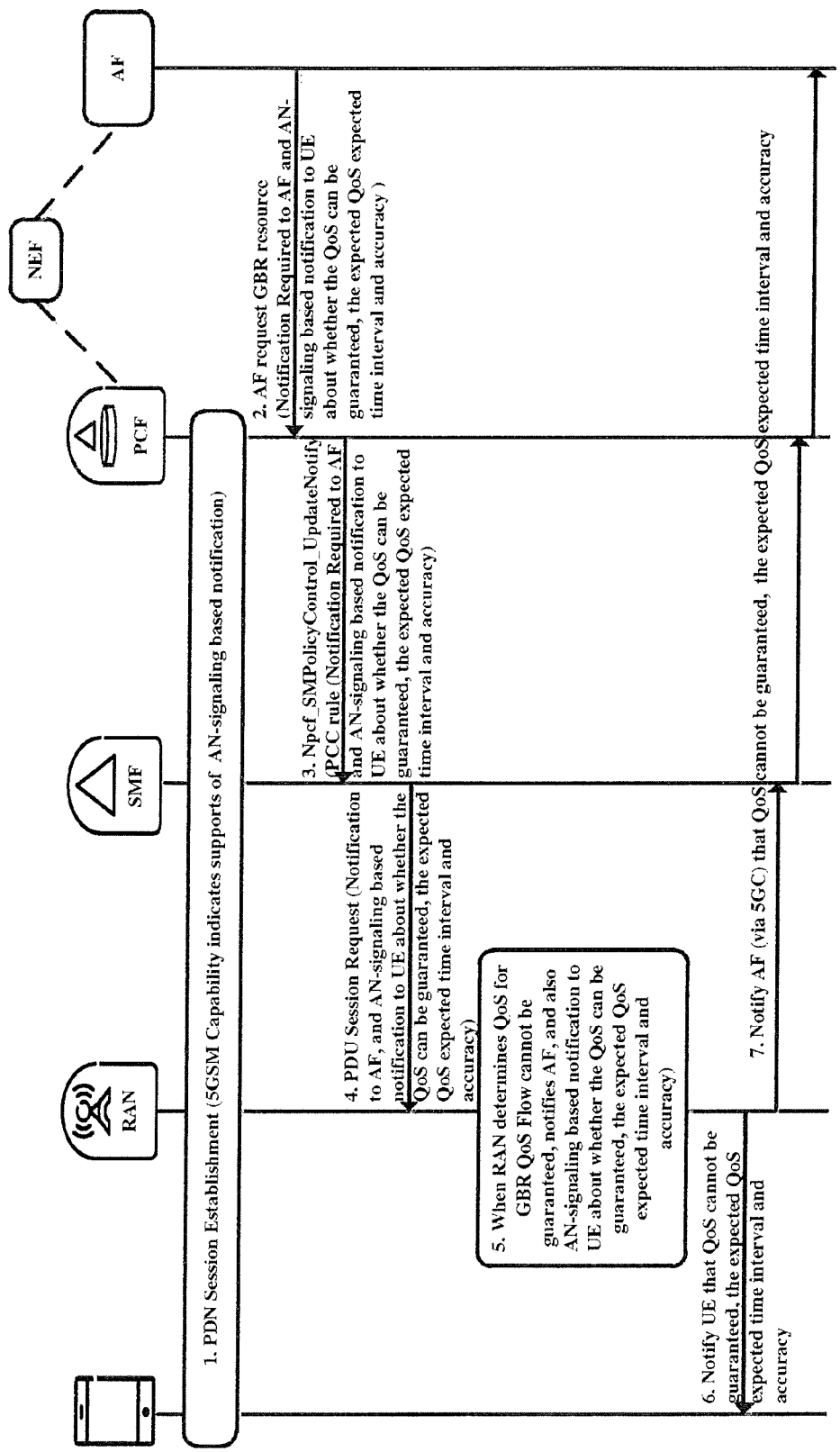
FIG. 7 illustratively shows signaling procedure for notification control in a communication system in accordance with an embodiment of the disclosure.

FIG. 7 illustratively shows a signaling procedure for notification control in a communication system in accordance with an embodiment of the disclosure.

Firstly, UE establishes a PDU Session, indicating the capability that AN-based notification is supported. As an additional embodiment, the UE may indicate whether AN-signaling based notification is supported, wanted or beneficial per application. Such information can be declared using same or similar information as used in the UE Route Selection Policy Rule (see TS 23.503) i.e. application identifier by traffic descriptor e.g. application descriptors with OSld and OSAppld(s). As is known, the 5GSM capability refers to the session management capability that a UE supports, e.g. PDU session type, reflective QoS, etc.

Secondly, the application function sends service information to the core network, in particular a PCF (policy control function) of the core network, requesting resource allocation. In the request, the AF also indicates whether notification to UE about whether QoS is fulfilled or re-fulfilled, the expected QoS expected time interval and accuracy, in addition the notification to the core network, is expected. As an additional embodiment, the AF may indicate which Application(s) in the UE is relevant for example by way of identifying application(s). The PCF then pass the notification control indication(s) to the SMF (with the required information).

In another embodiment, the application function sends service information to the core network, in particular a NEF (network exposure control function) of the core network, requesting resource allocation. Then the NEF pass the notification control indication(s) onto the PCF, and the PCF pass the notification control indication(s) to the SMF as is mentioned above.

Next, the SMF then enables the notification control to the RAN. If PCF also indicates that AN-based notification is expected, and the UE supports AN-based notification, the SMF will enable AN-signaling based notification to the RAN.

At last, when RAN determines that the QoS cannot be guaranteed, it notifies the core network, and also the UE if requested by the UE. The AN-signaling based notification may be RRC-based notification or MAC-based notification.

A core network, a UE and a RAN which can implement the corresponding method mentioned above are also illustrated.

Figures 8, 9:
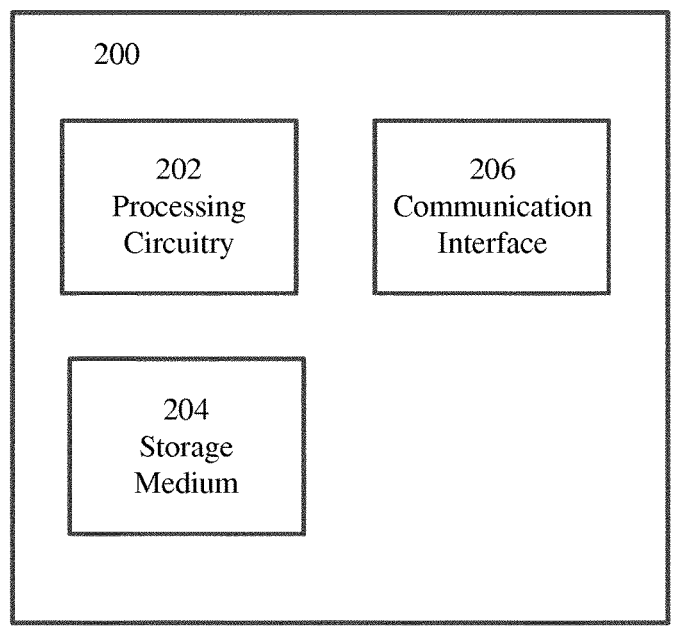
FIG. 8 illustratively shows an AN-signaling based notification in accordance with an embodiment of the disclosure.
FIG. 9 illustratively shows a functional unit of the core network in accordance with an embodiment of the disclosure.

FIG. 8 illustratively shows an AN-signaling based notification in accordance with an embodiment of the disclosure.

In the embodiment, the AN-signaling based notification may comprise field which is the notification of unfulfillment or re-fulfillment of QoS parameters as defined in a QoS Flow description; the field which is expected QoS figures when the current parameters of QoS Flow are unfulfilled; the field which is expected time interval, as well as the accuracy (e.g., confidence intervals, probability of correct estimation or other ways available for accuracy calculation) of the notification. The fields can be used by any combination thereof.

FIG. 9 shows a core network for notification control in a communication system, comprising: a processing circuitry 202 and a storage medium 204. It may also comprise a communication interface 206. Processing circuitry is provided using any combination of one or more of a suitable central processing unit (CPU), multiprocessor, microcontroller, digital signal processor (DSP), etc., capable of executing software instructions stored in a computer program product, e.g. in the form of a storage medium. The processing circuity 202 may further be provided as at least one application specific integrated circuit (ASIC) or field programmable gate array (FPGA). The storage medium may store instructions that, when executed by the processing circuity, cause the core network to: establishing a protocol data unit, PDU, session; and enabling a radio access network, RAN, to notify a user equipment, UE, of the unfulfillment or re-fulfillment of quality of service, QoS, for a QoS Flow in the PDU session.

Likewise, a RAN for notification control in a communication system can also be implemented by a similar functional unit. The RAN comprising: a processing circuity; and a storage medium storing instructions that, when executed by the processing circuity, cause the RAN to: receiving a notification enable indication from a core network that indicating enabling an access network, AN-signaling based notification, to notify a user equipment, UE, of the unfulfillment or re-fulfillment of quality of service, QoS, for a QoS flow in a protocol data unit, PDU, session; notifying the UE of the unfulfillment or re-fulfillment of QoS using the AN-signaling based notification.

Moreover, a UE for notification control in a communication system can also be implemented by a similar functional unit. The UE comprising: a processing circuity; and a storage medium storing instructions that, when executed by the processing circuity, cause the UE to: establishing a protocol data unit, PDU, session; receiving a notification that notifying the UE of the unfulfillment or re-fulfillment of quality of service, QoS, for a QoS Flow in a protocol data unit, PDU session in the AN-signaling based notification.

The term "UE" used herein may indicate all forms of devices enabled to communicate via a communication network, such as mobile telephones ("cellular" telephones) and laptops with mobile termination, and thus can be, for example, portable, pocket, hand-held devices, such as mobile phones, smart phones, personal digital assistants (PDA); computer-included devices, such as desktops, laptops; vehicles, or other devices, such as meters, household appliances, medical appliances, multimedia devices, etc., which communicate voice and/or data with radio access network and support D2D communications.

While the exemplary embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from its central scope. Therefore, it is intended that the present invention is not be limited to the particular embodiment disclosed as the best mode contemplated for carrying out the present invention, but that the present invention include all embodiments falling within the scope of the appended claims.

The invention claimed is:

1. A method, performed by a core network, for notification control in a communication system comprising a core network, a radio access network (RAN), and an application function (AF), the method comprising:
 establishing a protocol data unit (PDU) session for a user equipment (UE) served by the RAN;

receiving a request from the AF for AN-signaling based notifications indicative of the fulfillment or non-fulfillment of quality of service (QOS) for a QoS flow associated with the PDU session;

sending a notification enable signal to the RAN to enable the RAN to send AN-signaling based notifications notifying a user equipment (UE) of the unfulfillment or re-fulfillment of quality of service (QOS) for a QoS Flow in the PDU session using access stratum signaling; and wherein the AN-signaling based notification comprises a notification message originating in the RAN and sent directly to the UE by the RAN.

2. The method of claim 1, wherein:

the AN-signaling based notification includes the unfulfillment or re-fulfillment of QoS parameters as defined in a QoS Flow description; or the AN-signaling based notification is a radio resource control (RRC)-based notification; or the AN-signaling based notification is a media access control (MAC)-based notification; or the method further comprises receiving information indicating whether the UE supports an AN-signaling based notification or not; or the method further comprises enabling the RAN to notify the UE of the unfulfillment or re-fulfillment of QoS for the QoS Flow in the PDU session when the QoS Flow is addressed towards certain applications of the UE; or the method further comprises enabling the RAN to notify the core network of the unfulfillment or re-fulfillment of QoS for the QoS Flow in the PDU session.

3. The method of claim 1, wherein the AN-signaling based notification includes expected QoS figures when the current parameters of QoS Flow is unfulfilled.

4. The method of claim 3, wherein:

the expected QoS figures are provided in a new QoS profile or a subset of the new QoS profile; or the AN-signaling based notification further includes an expected time interval, the expected time interval indicating the duration the RAN expects to be able to support the expected QoS figures; or the AN-signaling based notification further includes an accuracy of the expected QoS figures.

5. The method of claim 4, wherein the AN-signaling based notification further includes an accuracy of the expected time interval.

6. The method of claim 1, further comprising receiving a request for resource allocation to a QoS Flow in the PDU session for the UE, the request including a notification control indication indicating whether notification to the UE is expected of the unfulfillment or re-fulfillment of QoS, for a QoS Flow in the PDU session.

7. The method of claim 6, wherein:

the request further indicates which QoS parameter the notification refers to, the QoS parameters including the QoS parameters as defined in a QoS Flow description; or the request further requests to notify expected QoS figures; or the notification control indication further indicates whether the AN-signaling based notification to certain applications of the UE is expected.

8. The method of claim 1, wherein the method comprises:

only enabling the RAN to notify a UE of the unfulfillment or re-fulfillment of QoS for the QoS Flow in a PDU session when the UE supports the AN-signaling based notification; or only enabling the RAN to notify a UE of the unfulfillment or re-fulfillment of QoS for the QoS Flow in a PDU session when the AN-signaling based notification is expected; or only enabling the RAN to notify a UE of the unfulfillment or re-fulfillment of QoS for the QoS Flow in a PDU session when the UE supports the AN-signaling based notification and the AN-signaling based notification is expected.

9. The method of claim 8:

wherein the method further comprises receiving information indicating whether the UE supports an AN-signaling based notification or not; and wherein the received information indicates whether the UE supports the AN-signaling based notification or not for certain applications in the UE.

10. A method for notification control in a communication system comprising a core network, a radio access network (RAN), and an application function (AF), the method comprising:

receiving a notification enable indication from a core network enabling access network (AN)-signaling based notifications to a user equipment (UE) of the unfulfillment or re-fulfillment of quality of service (QOS) for a QoS flow in a protocol data unit (PDU) session; and notifying the UE of the unfulfillment or re-fulfillment of QoS by sending an AN-signaling based notification to the UE using access stratum signaling; and wherein the AN-signaling based notification comprises a notification message originating in the RAN and sent directly to the UE by the RAN.

11. The method of claim 10, wherein the notification enable indication further indicates enabling a AN-signaling based notification to notify the UE of the unfulfillment or re-fulfillment of QoS for the QoS Flow in the PDU session.

12. The method of claim 11, wherein:

the AN-signaling based notification includes the unfulfillment or re-fulfillment of QoS parameters as defined in a QoS Flow description; or the AN-signaling based notification further includes expected QoS figures when the current parameters of QoS Flow being unfulfilled.

13. The method of claim 12, wherein:

the expected QoS figures are provided in a new QoS profile or a subset of the new QoS profile; or the AN-signaling based notification further includes an expected time interval; the expected time interval indicating the duration the RAN expects to be able to support the expected QoS figures.

14. The method of claim 13, wherein the AN-signaling based notification further includes an accuracy of the expected QoS figures or the AN-signaling based notification further includes an accuracy of the expected time interval.

15. The method of claim 10, wherein:

the method further comprises notifying the core network of the unfulfillment or re-fulfillment in QoS for the QoS Flow in the PDU session; or the AN-signaling based notification is a radio resource control, RRC-based notification; or the AN-signaling based notification is a media access control, MAC-based notification.

16. A user equipment (UE) for notification control in a communication system comprising a core network and a radio access network (RAN), the UE comprising:

processing circuitry; and memory containing instructions executable by the processing circuitry whereby the UE is operative to:

establish a protocol data unit (PDU) session;

send information to RAN indicating support for access network (AN)-signaling based QoS notifications;

receive an AN-signaling based notification from the RAN via access stratum signaling notifying the UE of the unfulfillment or re-fulfillment of quality of service (QoS) for a QoS Flow in a protocol data unit (PDU) session; and wherein the AN-signaling based notification comprises a notification message originating in the RAN and sent directly to the UE by the RAN.

17. The UE of claim 16, wherein the instructions are such that the UE is operative to:

wherein the instructions are such that the UE is operative to send information indicating whether the UE supports an AN-signaling based notification or not; or wherein the notification further notifies of the unfulfillment or re-fulfillment of QoS for the QoS Flow in the PDU session addressed towards certain applications in the UE, using the related QoS Flow, when the UE supports the AN-signaling based notification; or wherein the AN-signaling based notification includes the unfulfillment or re-fulfillment of QoS parameters as defined in a QoS Flow description.

18. The UE of claim 16, wherein the AN-signaling based notification includes expected QoS figures when the current parameters of QoS Flow are unfulfilled.

19. The UE of claim 18:

wherein the expected QoS figures are provided in a new QoS profile or a subset of the new QoS profile; or wherein the AN-signaling based notification further includes an expected time interval, the expected time interval indicating the duration the RAN expects to be able to support the expected QoS figures; or wherein the AN-signaling based notification further includes an accuracy of the expected QoS figures.

20. The UE of claim 16, wherein the instructions are such that the UE is operative to adapt its behaviors according to the AN-signaling based notification by:

changing traffic generation features, changing to application features, or changing control features according to expected QoS figures that are included in the AN-signaling based notification; or entering a safe mode when the AN-signaling based notification notifies the UE of the unfulfillment of QoS; or triggering a PDU session modification to reuse the parameters included in the expected QoS figures.

* * * * *

UNITED STATES PATENT AND TRADEMARK OFFICE
CERTIFICATE OF CORRECTION

PATENT NO. : 12,267,730 B2  
APPLICATION NO. : 17/283063  
DATED : April 1, 2025  
INVENTOR(S) : Condoluci et al.

Page 1 of 3

It is certified that error appears in the above-identified patent and that said Letters Patent is hereby corrected as shown below:

On the Title Page

In Figure, for Tag "5", Line 8, delete "accuracy)" and insert -- accuracy --, therefor.

In the Drawings

In Fig. 1, Sheet 1 of 7, delete "N 13" and insert -- N13 --, therefor.

In Fig. 3, Sheet 3 of 7, delete "FIG 3" and insert -- FIG. 3 --, therefor.

In Fig. 4, Sheet 3 of 7, delete "FIG 4" and insert -- FIG. 4 --, therefor.

In Fig. 5, Sheet 4 of 7, delete "FIG 5" and insert -- FIG. 5 --, therefor.

In Fig. 6, Sheet 5 of 7, delete "FIG 6" and insert -- FIG. 6 --, therefor.

In Fig. 7, Sheet 6 of 7, for Tag "5", Line 8, delete "accuracy)" and insert -- accuracy --, therefor.

In Fig. 7, Sheet 6 of 7, delete "FIG 7" and insert -- FIG. 7 --, therefor.

In Fig. 8, Sheet 7 of 7, delete "FIG 8" and insert -- FIG. 8 --, therefor.

In Fig. 9, Sheet 7 of 7, delete "FIG 9" and insert -- FIG. 9 --, therefor.

In the Specification

In Column 1, Line 41, delete "form" and insert -- from --, therefor.

Signed and Sealed this  
Twenty-third Day of September, 2025

John A. Squires  
*Director of the United States Patent and Trademark Office*

In Column 1, Line 63, delete "only" and insert -- only to --, therefor.

In Column 2, Line 52, delete "circuity;" and insert -- circuitry; --, therefor.

In Column 2, Line 53, delete "circuity," and insert -- circuitry, --, therefor.

In Column 2, Line 59, delete "circuity;" and insert -- circuitry; --, therefor.

In Column 2, Line 61, delete "circuity," and insert -- circuitry, --, therefor.

In Column 2, Line 67, delete "notification" and insert -- notification. --, therefor.

In Column 3, Line 3, delete "circuity;" and insert -- circuitry; --, therefor.

In Column 3, Line 5, delete "circuity," and insert -- circuitry, --, therefor.

In Column 3, Line 12, delete "circuity;" and insert -- circuitry; --, therefor.

In Column 3, Line 14, delete "circuity," and insert -- circuitry, --, therefor.

In Column 4, Line 54, delete "illustrate" and insert -- illustrates --, therefor.

In Column 6, Line 12, delete "to the" and insert -- the --, therefor.

In Column 6, Line 47, delete "weather" and insert -- whether --, therefor.

In Column 11, Line 65, delete "circuity" and insert -- circuitry --, therefor.

In Column 12, Line 6, delete "circuity" and insert -- circuitry --, therefor.

In Column 12, Line 10, delete "circuity," and insert -- circuitry, --, therefor.

In Column 12, Line 17, delete "circuity;" and insert -- circuitry; --, therefor.

In Column 12, Line 19, delete "circuity," and insert -- circuitry, --, therefor.

In Column 12, Line 29, delete "circuity;" and insert -- circuitry; --, therefor.

In Column 12, Line 31, delete "circuity," and insert -- circuitry, --, therefor.

In Column 12, Line 56, delete "not be" and insert -- not --, therefor.

CERTIFICATE OF CORRECTION (continued)
U.S. Pat. No. 12,267,730 B2

In the Claims

In Column 13, Line 3, in Claim 1, delete "(QOS)" and insert -- (QoS) --, therefor.

In Column 13, Line 8, in Claim 1, delete "(QOS)" and insert -- (QoS) --, therefor.

In Column 13, Lines 23-24, in Claim 2, delete "an AN-signaling based notification" and insert -- the AN-signaling based notification --, therefor.

In Column 14, Lines 12-13, in Claim 9, delete "an AN-ignaling based notification" and insert -- the AN-signaling based notification --, therefor.

In Column 14, Line 24, in Claim 10, delete "(QOS)" and insert -- (QoS) --, therefor.

In Column 14, Lines 33-34, in Claim 11, delete "a AN-signaling based notification" and insert -- the AN-signaling based notification --, therefor.

In Column 14, Line 47, in Claim 13, delete "interval; the" and insert -- interval, the --, therefor.

In Column 15, Line 16, in Claim 17, delete "an AN-signaling based notification" and insert -- the AN-signaling based notification --, therefor.